Sept. 27, 1927.

R. LEA 1,643,504

FISH BEHEADING MACHINE

Original Filed Jan. 11, 1926

INVENTOR
RICHARD LEA
BY
George F. Ballay
ATTORNEY

Patented Sept. 27, 1927.

1,643,504

UNITED STATES PATENT OFFICE.

RICHARD LEA, OF ALAMEDA, CALIFORNIA.

FISH-BEHEADING MACHINE.

Application filed January 11, 1926, Serial No. 80,571. Renewed March 1, 1927.

This invention relates to fish cutting machines used for beheading fish.

The invention especially relates to fish cutting machines having a conveyor onto which the fish is placed and carried past a header knife for the purpose of beheading the fish.

A general object of the invention is to provide improved means for guiding and conveying the fish to the header-knife.

One of the primary objects of the present invention is to improve the construction of fish beheading machines by providing an improved type of guide that is adapted for insertion beneath one of the forward fins of the fish, and which will properly guide same to the header knife so as to behead the fish between the gill thereof and said forward fin, and thereby eliminate much trouble and waste caused by cutting off too small or too large a portion of fish which is a common fault in machines of this kind when beheading fish of various sizes.

A further object of the invention is to provide improved means for conveying the fish to the header-knife, the said means consisting of curved fingers secured to a travelling belt or chain onto which the fish is conveyed to a number of rotating carriers that carry the fish past the header-knife. The purpose of the curved fingers are to eliminate the possibility of the fish being pinched between said fingers and the top of the table when it is being transferred from the table to the rotating carriers.

The invention possesses many objects and features of advantage, some of which with the foregoing will be made manifest in the following description of the preferred form of the invention which is illustrated in the drawings accompanying and forming part of the specification.

It is to be understood that it is not intended to limit the invention to the embodiment shown by said drawings and descriptions, as variations may be adopted within the scope of the invention as set forth in the claims.

Figure 1:
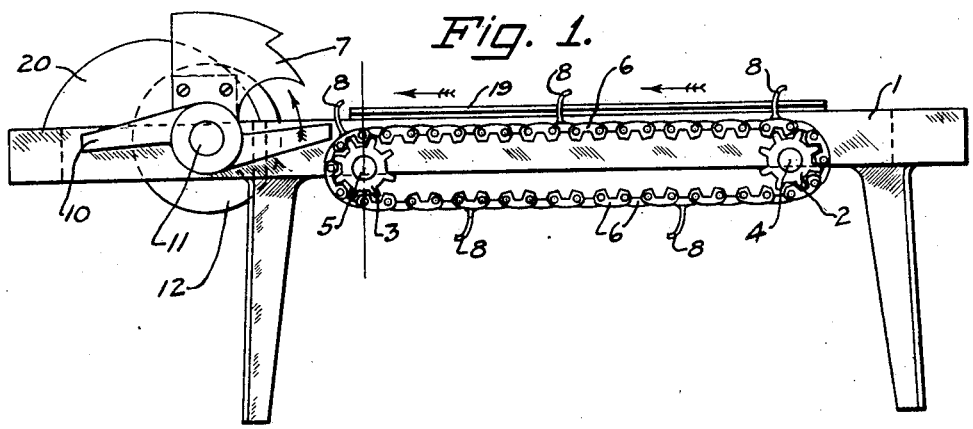
Figure 1 is a side elevation of one type of machine involving the invention.

According to the construction shown the numeral 1 represents the main frame which is preferably constructed in the form of a table onto which the various parts are mounted. Numerals 2 and 3 represent gear-wheels fixed on revolvable shafts 4 and 5 respectively for the purpose of operating a belt or chain 6 mounted on said gear-wheels, thereby forming a conveyor for conveying the fish to a header-knife 7 when said gear-wheels are revolved. A number of vertical curved fingers 8 are provided, and substantially fastened to the various chains 6 to make the conveyor positive. Slots 9 in table 1 are provided to allow for the movement of the chains 6.

On the outer end of table 1 a plurality of carriers 10 are mounted on a revolvable shaft 11 and securely keyed thereto. The said shaft 11 is provided with a drive pulley 12, a gear-wheel 13, and a driving chain 14, the teeth of which are adapted to come into constant mesh with the teeth of a gear-wheel 15 that is fixed on the outer end of shaft 5 that is longitudinally mounted beneath the table top 1 and supported thereon by bearings 16 and 17. Slots 18 are provided in the top of table 1 to allow for the movement of the rotating carriers 10.

Figure 2:
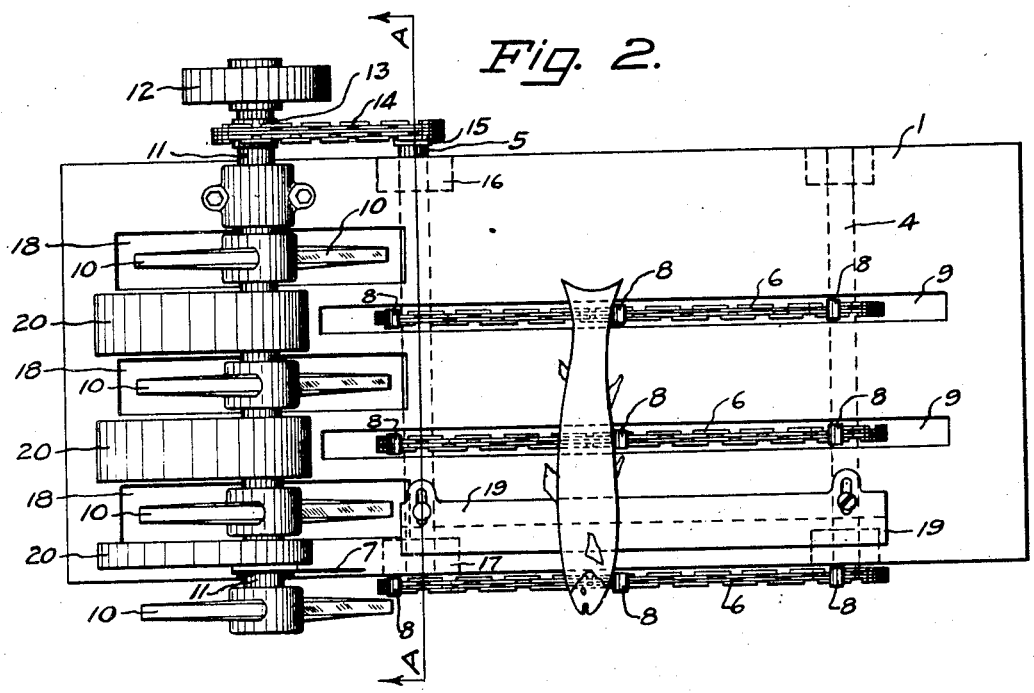
Figure 2 is a top plan of the invention.

From the foregoing it will be observed that if shaft 11 is rotated, the gear-wheel 15 mounted on shaft 5 and gear-wheels 3 also mounted thereon will be revolved, thus imparting movement to the chains 6, and also, if a fish is placed on the table as shown in Figure 2, the curved fingers provided on said chains 6 will convey the fish to the rotating carriers 10 which will force the fish over the stationary curved members 20 and past the header-knife 7, thus beheading the fish. The fingers 8 on chains 6 are arranged in series and located in relation to the position of the carriers 9 as shown in Figure 1, and are spaced apart in proportion to the speed of said carriers so as to always convey a fish thereto at the proper time.

As hereinbefore mentioned, an object of the invention is the provision of means to properly guide the fish to the header-knife and eliminate the waste caused by decapitating too much fish. On practically all fish, regardless of size, the proper place to behead same is the portion between the first fin behind the head on the side of the fish and the gill. It is therefore an object of this invention to provide means for a fish beheading machine that will guide the fish by said fin and to arrange the header-knife slightly ahead of the guide and thus decapitate all fish placed on the machine between the first fin on the side of the fish and the gill.

Figure 3:
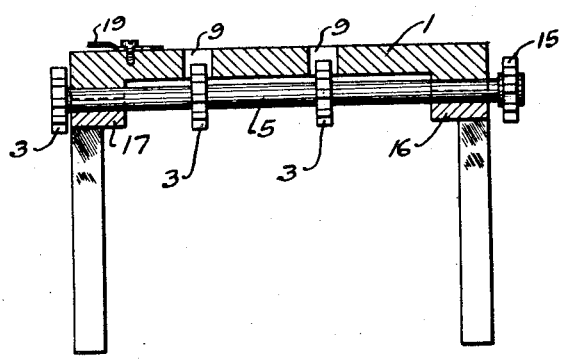
Figure 3 is an end sectional view taken on lines A—A showing some of the various gear-wheels that drive the chains, and also the form of the guide.

A preferred type of such means is illustrated by the guide 19 shown in Figures 1, 2 and 3 and the position of the header-knife 7 arranged slightly ahead of the guide shown in Figures 1 and 2. The guide can be simply made out of sheet metal and formed into any shape necessary to properly guide the fish and is preferably adjustably secured to the table top as shown in Figures 2 and 3. When it is desired to behead a fish, the said fish is placed on the table and the first fin on the side thereof is placed under the guide 19 and longitudinally moved until the portion of the fin that is connected to the fish comes against the outermost edge of the guide. The fish is then conveyed to the header-knife by the curved fingers 8 that are fastened to the travelling chains 6 and is transferred to the rotating carriers 10 without any interference or pinching effect of the fingers due to their vertically curved shape, and it is then carried past the header-knife 7 by the carriers 10 and beheaded between the first fin and the gil.

Having thus illustrated and described a certain form of construction and arrangement of parts pertaining to the invention, it is to be understood that the improvements may be embodied on any type of fish decapitating machine, which obviously may be built up in any suitable manner, the present illustration not being utilized as indicating the only form of device onto which the parts may be mounted, and it is therefore desired to include in this application for Letters Patent all that comes within the range of the invention as set forth in the claims hereinafter mentioned.

What is claimed:

1. A fish beheading machine having a main frame, a header-knife and means for conveying fish thereto, and a guide adapted for insertion beneath one of the forward fins of the fish to properly locate different sizes of fish and guide same to the header-knife.

2. A fish beheading machine having a main frame, a header-knife and means for conveying fish thereto, and an adjustable guide adapted for insertion beneath one of the forward fins of the fish to properly locate the fish and guide same to the header-knife.

3. A fish beheading machine comprising a main frame in the form of a table, a drive shaft having a plurality of carriers mounted thereon, gear wheels fixed on a pair of revolvable shafts that are mounted on said frame parallel to each other and to said drive shaft, said gear wheels being arranged on said shafts in series and adapted to impart longitudinal movement to a plurality of conveying chains mounted thereon, said conveying chains being provided with a plurality of vertically curved fingers arranged in series thereupon and adapted to extend upwardly and above the top surface of the frame, a stationary header-knife fixed to the frame at the outer end thereof and above the drive shaft, a stationary guide adapted for insertion beneath one of the forward fins of the fish to locate the fish by and guide same to the header-knife, and means connecting the drive shaft to the conveying mechanism.

4. A fish beheading machine having in combination with a stationary header-knife and a number of rotating fish carriers, a stationary undercut guide adapted for insertion beneath one of the forward fins of the fish and a number of travelling vertical curved fingers for the purposes of properly conveying the fish to the rotating carriers and the header-knife.

In testimony whereof, I hereunto affix my signature.

RICHARD LEA.